United States Patent [19]
Horst

[11] Patent Number: 5,108,267
[45] Date of Patent: Apr. 28, 1992

[54] DUAL-MODE CONTROL FOR HYDROSTATIC TRANSMISSION

[75] Inventor: Robert C. Horst, Coon Rapids, Minn.

[73] Assignee: Eaton Corporation, Cleveland, Ohio

[21] Appl. No.: 716,424

[22] Filed: Jun. 17, 1991

[51] Int. Cl.$^5$ ............................................... F04B 1/26
[52] U.S. Cl. ................................ 417/218; 417/222 R; 60/444; 91/506
[58] Field of Search .................. 417/218, 222 R, 219; 60/444, 443; 91/506; 92/12.2

[56] References Cited

U.S. PATENT DOCUMENTS

| | | | |
|---|---|---|---|
| Re. 31,711 | 10/1984 | Horiuchi | 417/222 R |
| 3,647,322 | 3/1972 | Molly | 417/217 |
| 3,715,017 | 2/1973 | Jenny | 192/4 |
| 3,898,812 | 8/1975 | Walton | 60/431 |
| 4,050,247 | 9/1977 | Connett | 60/444 |
| 4,364,230 | 12/1982 | Holmes | 417/218 |
| 4,463,559 | 8/1984 | Holdenreid | 60/444 |
| 4,530,416 | 7/1985 | Kassai | 180/307 |
| 4,823,552 | 4/1989 | Ezell et al. | 60/443 |
| 4,846,046 | 7/1989 | Kanai et al. | 60/444 |
| 4,951,462 | 8/1990 | Graf | 60/444 |

Primary Examiner—Leonard E. Smith
Attorney, Agent, or Firm—L. J. Kasper

[57] ABSTRACT

A variable displacement hydrostatic unit (11) includes a swashplate (23), the position of which is controlled by a servo piston (73). A multiple mode control (33) is disclosed, including a main valve member (63) and a secondary valve member (65), both of which are attached to a linkage member (61) by which movement of a manual control handle (47) actuates the main and secondary valve members. The flow of control pressure from a charge pump (21) ot the servo piston (73) is controlled by a pair of solenoid valves (83,85) having two control conditions. In one, control pressure flows through the main valve member (63) to give a normal operating mode (FIG. 6), while in the other control condition, control pressure flows through the secondary valve member (65) to provide a secondary operating mode (FIG. 7).

8 Claims, 5 Drawing Sheets

DUAL-MODE CONTROL FOR HYDROSTATIC TRANSMISSION

BACKGROUND OF THE DISCLOSURE

The present invention relates to hydrostatic transmissions and control systems therefor, and more particularly, to such control systems which make it possible for the vehicle operator to select among multiple modes of operation.

Although the present invention may be used with any type of variable displacement pump or motor in which the displacement of the unit is controlled by a fluid pressure actuated servomechanism, the invention is especially suited for use with axial piston swashplate pumps and motors, and will be described in connection therewith.

It is well known in variable displacement axial piston swashplate pumps and motors to control the position of the swashplate by porting fluid under pressure to one of two servos having pistons attached to the swashplate (the stroking servo) and by porting fluid in the other servo (the destroking servo) to drain. The control of such fluid is governed generally by a control valve having a control spool which has a feedback linkage connected to the swashplate, or to the servo-pistons. Such control valves are typically referred to as "manual controllers", because the position of the swashplate ultimately corresponds to the position of a manual control handle.

Such manual controllers are widely used, especially in the mobile hydraulics market, in connection with hydrostatic transmissions which provide vehicle propulsion. Such manual controllers are simple, inexpensive, and reliable. However, such manual controllers provide only a single operating mode or "gain" rate (i.e., the change in swashplate position for a given change in control handle position).

Many vehicles which are propelled by hydrostatic transmissions need to be able to operate in more than one operating mode, or at more than one gain rate. For example, vehicles used on construction sites need to be able to operate over the full range of available pump displacements and vehicle speeds when moving from one site to another (i.e., the "transport mode"). However, while such a vehicle is being used at a work site, it needs to operate over only a very narrow range of vehicle speeds and pump displacements (i.e., an "inching" mode). Control of swashplate position and vehicle speed over a very narrow range, using a standard manual controller, is typically too difficult to be acceptable to the operators of such vehicles.

In an attempt to overcome the problems described above, the prior art has developed various inching valves and inching controls, whereby it would be possible for the vehicle operator to use all, or most of, the normal control handle movement to select only a narrow range of swashplate displacements. The most common arrangement in the prior art is that set forth in U.S. Pat. No. 3,715,017, wherein there is provided an inching valve which reduces the control pressure communicated from the charge pump to the manual controller. Theoretically, reducing the charge pressure should, for any given control handle position, reduce the swashplate angle, which is the objective of an inching control system. However, inching control systems which operate on the principle of reducing charge pressure have not been especially successful commercially, and do not actually provide true inching control of the type desired.

In a properly designed servo system for an axial piston pump, one of the criteria for selecting the charge pressure to be used (typically, 250 or 300 psi), is to have a pressure high enough that it is able to provide a predictable swashplate versus control handle relationship, independent of system pressure, which exerts an opposing moment on the swashplate. In an inching control system, it would be desirable to have a gain rate about ⅓ that in the normal operating mode. If the control pressure is reduced substantially, in an attempt to achieve such a reduced gain rate, the swashplate angle versus control handle position will now be a function of system pressure. To illustrate the problem with such inching control systems more specifically, at relatively high system pressure (e.g., 4,000 psi), movement of the control handle over its full range may result in displacement of the swashplate over only a small portion of its full range of displacement, which is the desired result of an inching control system. However, at relatively low system pressure (e.g., 1,000 psi), movement of the control handle over its full range may still result in movement of the swashplate over its full range of displacements, the same as in a normal operating mode.

SUMMARY OF THE INVENTION

Accordingly, it is an object of the present invention to provide a hydrostatic transmission and an improved multiple mode control system therefor which is able to maintain a predictable, proportional relationship between swashplate displacement and control handle position, substantially independent of system pressure.

It is a further object of the present invention to provide such an improved multiple mode control system which does not add substantially to the size, expense, or complexity of the overall servo control system.

The above and other objects are accomplished by the provision of a variable displacement hydrostatic unit including fluid pressure responsive means for varying the displacement of the unit, and charge pump means comprising the source of fluid for the displacement varying means. Main control means includes a main valve member movable between a neutral position, blocking fluid communication from the charge pump means to the displacement varying means, and a first control position permitting fluid communication from the charge pump means to the displacement varying means. Feedback linkage means is operably associated with the displacement varying means and the main valve member to move the main valve member from the first control position to the neutral position, in response to the flow of a predetermined volume X of fluid from the charge pump means to the displacement varying means. The main valve member and the feedback linkage means define a main linkage length A, relative to the displacement varying means.

The improved hydrostatic unit is characterized by the main control means further including a secondary valve member movable between a neutral position, blocking fluid communication from the charge pump means to the displacement varying means, and a first control position permitting fluid communication from the charge pump means to the displacement varying means. The feedback linkage means is operably associated also with the secondary valve member to move it from the first control position to the neutral position, in response to the flow of a predetermined volume Y of fluid from the charge pump means to the displacement varying means, the volume X being substantially greater than the volume Y. The secondary valve member and the linkage means define a secondary linkage length B, relative to the displacement varying means, the length A being substantially greater than the length B. A control means is selectively operable between a main control condition blocking fluid communication from the secondary valve member to the displacement varying means and a secondary control position blocking fluid communication from the main valve member to the displacement varying means.

DESCRIPTION OF THE PREFERRED EMBODIMENT

Figure 1:
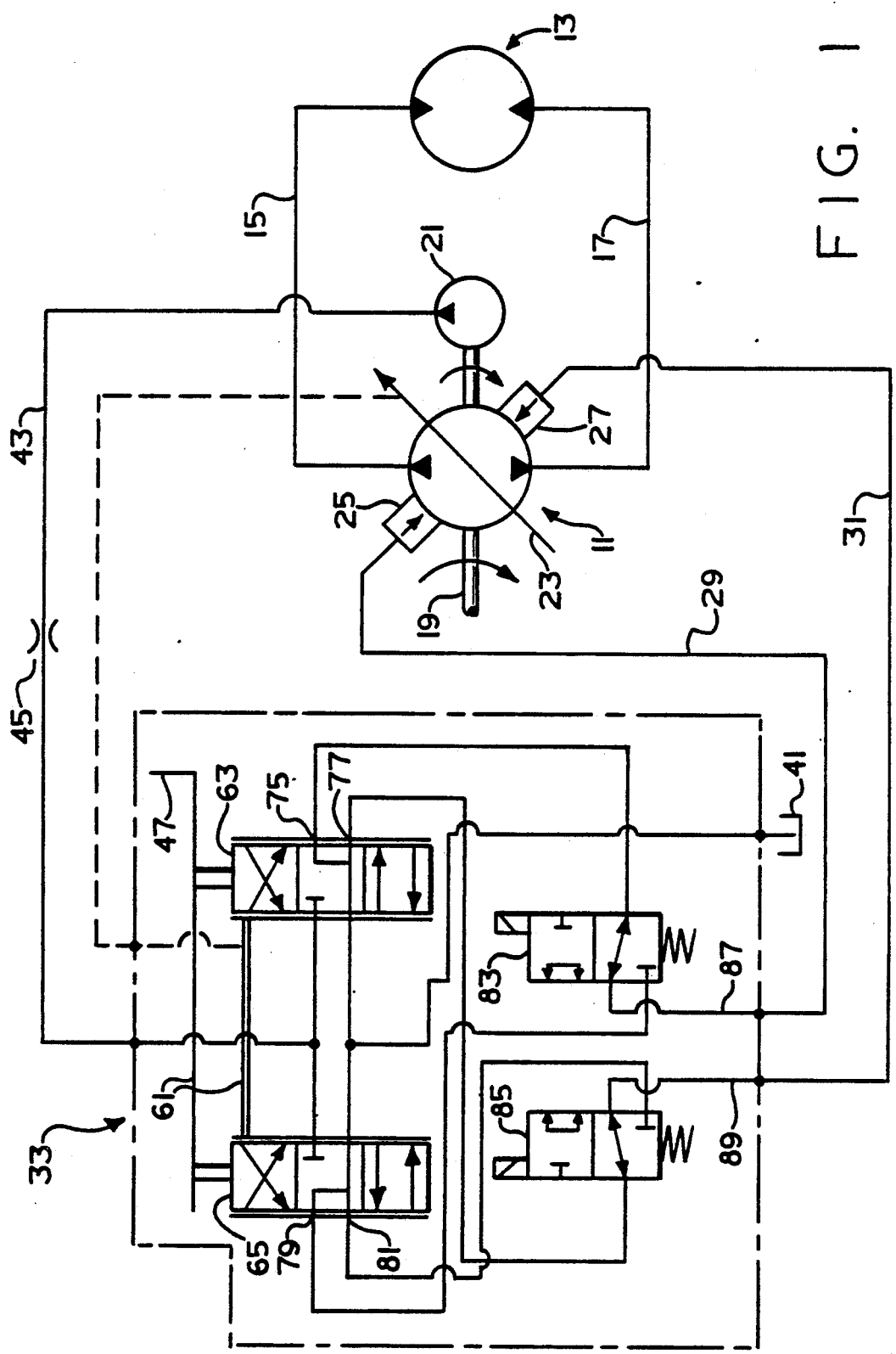
FIG. 1 is an electrical and hydraulic schematic of a hydrostatic transmission and control system made in accordance with the present invention.

Referring now to the drawings, which are not intended to limit the invention, FIG. 1 illustrates a hydrostatic transmission of the type which is generally well known, and is sold commercially by the assignee of the present invention, but which includes the novel control assembly of the present invention. The transmission and control system of FIG. 1 includes a variable displacement, swashplate-type, axial piston pump 11 hydraulically coupled to a fixed displacement, swashplate-type, axial piston motor 13 by means of fluid conduits 15 and 17. Although the invention may be especially suited for use with axial piston pumps and motors, it should be understood that the present invention is not limited to any particular type or configuration of pump and motor.

Pump 11 is of a well known type, and includes an input shaft 19 which receives input drive torque from a prime mover (not show). The input shaft 19 drives the rotating group of the pump 11 in a manner well known in the art, and also drives a charge pump 21. The charge pump 21 is hydraulically coupled to the conduits 15 and 17 in a manner which is well known to those skilled in the art, forms no part of the present invention, and is illustrated and described in greater detail in U.S. Pat. No. 4,951,462, assigned to the assignee of the present invention and incorporated herein by reference.

Pump 11 further includes a swashplate 23 which is movable over-center by means of a pair of stroking cylinders 25 and 27. The stroking cylinders 25 and 27 are hydraulically coupled by means of fluid conduits 29 and 31, respectively, to a novel control assembly, generally designated 33. On many axial piston pumps, the stroking cylinders 25 and 27 would literally comprise two separate cylinders, disposed at opposite ends of a tiltable swashplate. The embodiment of the invention illustrated in FIGS. 2 through 7 includes a single servo-piston disposed within a cylinder, and is the full functional equivalent of separate stroking cylinders 25 and 27, for purposes of the present invention.

Figure 2:
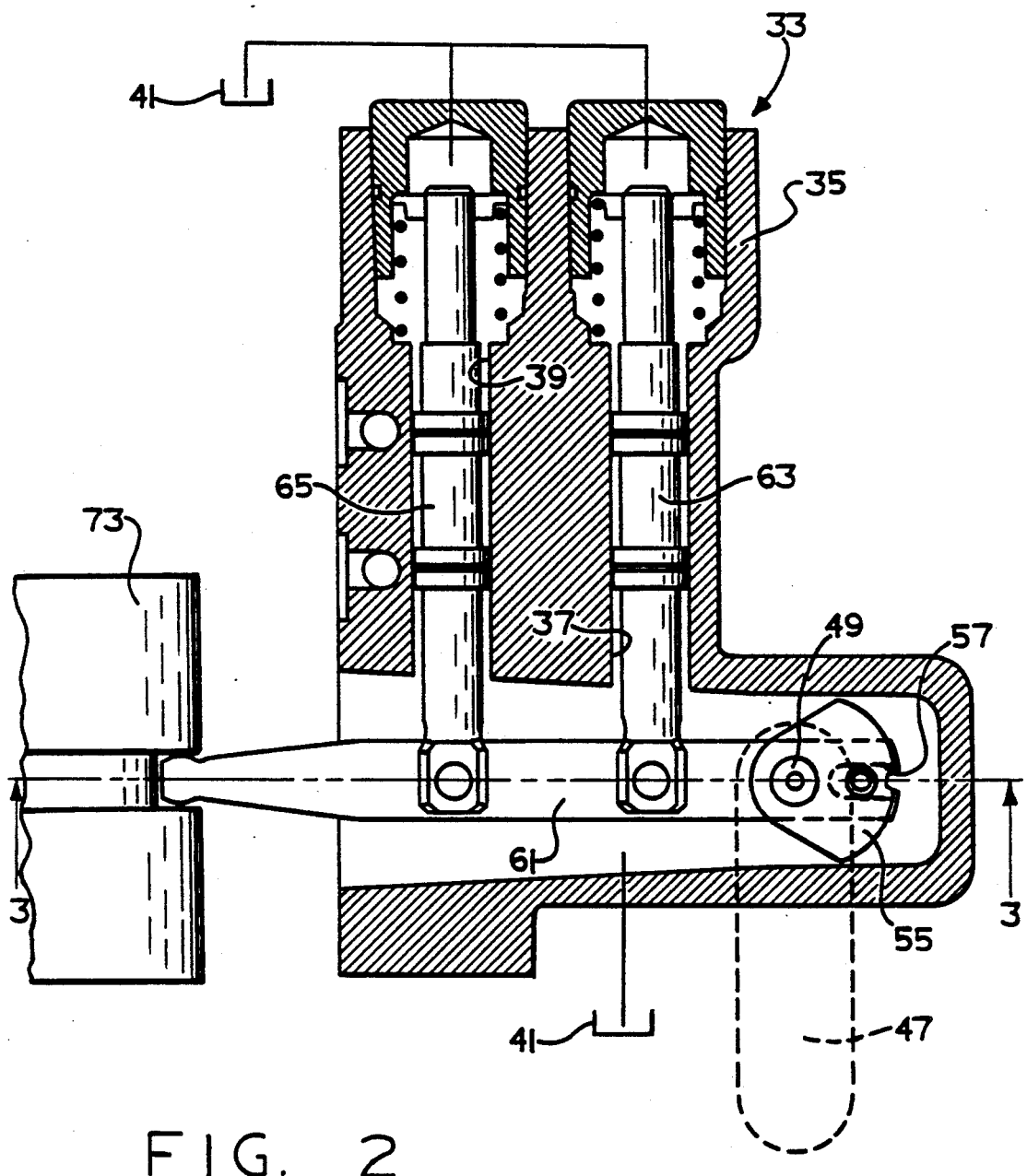
FIG. 2 is a fragmentary, axial cross-section through a portion of the control assembly of the present invention.

Referring now primarily to FIG. 2, the control assembly 33 of the present invention is structurally and functionally similar to the manual controller sold commercially by the assignee of the present invention. The referenced manual controller is illustrated and described in greater detail in U.S. Pat. No. 4,274,257, assigned to the assignee of the present invention, and incorporated herein by reference.

The control assembly 33 includes a valve housing 35, defining substantially identical spool bores 37 and 39, the ends of which are in open communication with a system reservoir 41 (see also FIG. 1). The central portion of each of the spool bores 37 and 39 is in communication with the output of the charge pump 21 by means of a conduit 43 (see FIG. 1), with the control fluid from the charge pump 21 flowing through a restriction orifice 45. The housing 35 also defines various fluid passages which provide communication between the spool bores 37 and 39 and the fluid conduits 29 and 31, as will be described in greater detail subsequently.

Figure 3:
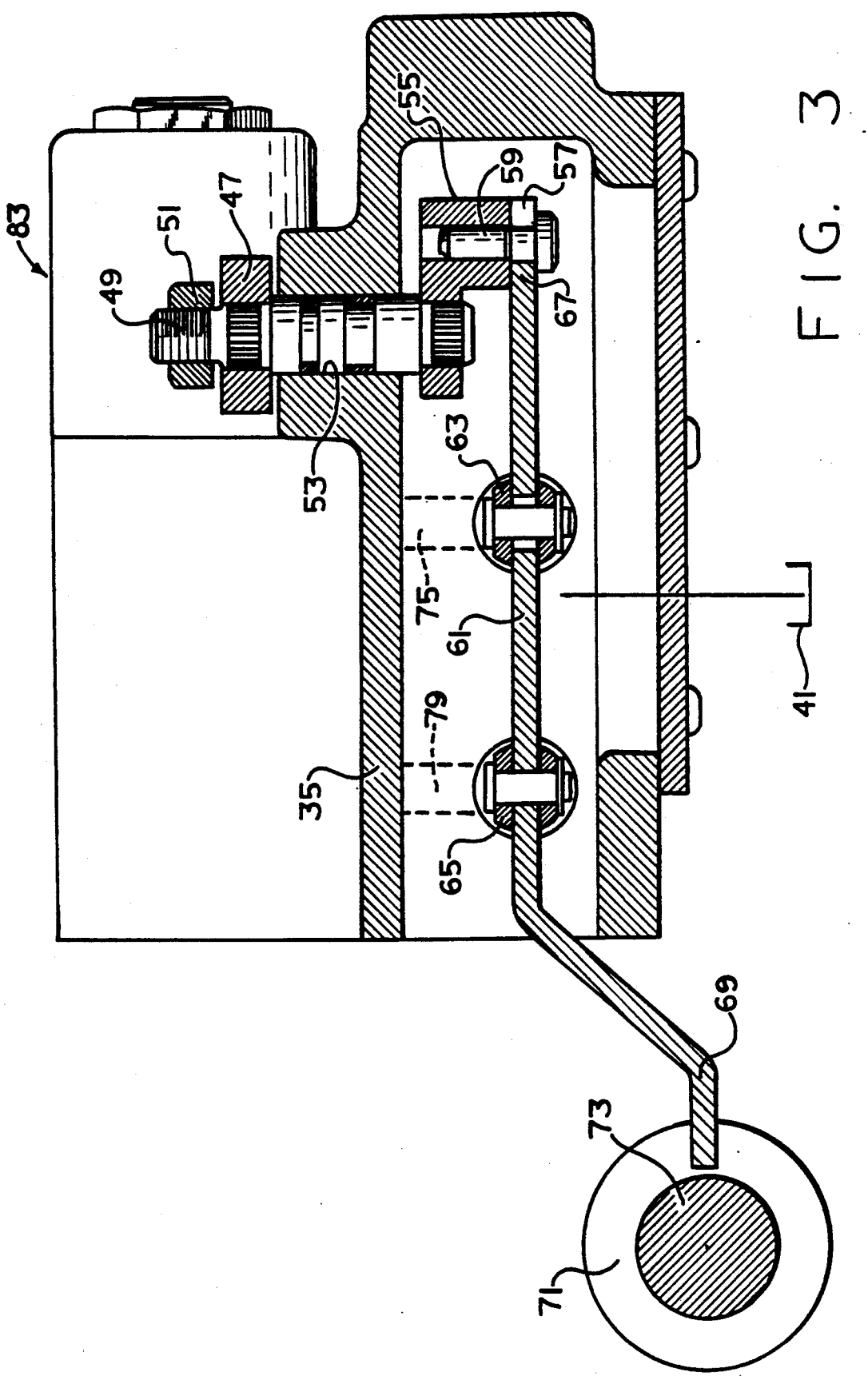
FIG. 3 is an enlarged, transverse cross-section taken on line 3—3 of FIG. 2.

Referring now primarily to FIGS. 2 and 3, the control assembly 33 further includes a manual control handle or lever 47 which is fixed, such as by means of serrations, to the upper end (in FIG. 3) of a stud member 49, having a nut 51 threaded to the member 49 to retain the handle 47. The central portion of the stud member 49 is rotatably received within a bore 53 defined by the housing 35. The lower end of the stud member 49 is fixed, such as by means of serrations, to a bellcrank member 55. Linkage member 61, as may best be seen in FIG. 2, defines a generally U-shaped slot 57. Disposed within the slot 57, and axially slidable relative thereto, is a pin member 59 which is in fixed engagement with bellcrank member 55, the function of which will be described in greater detail subsequently.

Referring still to FIG. 2, if the left end of the linkage member 61 is viewed as being instantaneously fixed, it may be seen that rotation of the manual control handle 47 about the axis of the stud member 49 in a clockwise direction will result in clockwise movement of the linkage member 61. Conversely, rotation of the manual control handle 47 in a counterclockwise direction about the axis of the stud member 49 will result in counterclockwise movement of the linkage member 61 about its left end in FIG. 2.

Disposed within the spool bore 37 is a main valve spool 63, which is pivotally and slidably connected to the linkage member 61 (see FIG. 3). Disposed in the spool bore 39 is a secondary valve spool 65, which is pivotally connected to the linkage member 61 (see FIG. 3) but is not slidably connected to the member 61. Those skilled in the art will understand that either of the valve spools 63 and 65 could be slidably, as well as pivotally connected, but at least one of the two valve spools must have more than merely a pivotal connection, to permit the displacement of the linkage member 61 from its neutral position shown in FIG. 2.

Referring still to FIGS. 2 and 3, the linkage member 61 includes an input end 67 through which the pin member 59 extends, and a servo end 69 which is received within an annular groove 71 of a servo-piston 73. As was described previously, the servo-piston 73 is the functional equivalent of the stroking cylinders 25 and 27 shown schematically in FIG. 1, wherein one end of the piston 73 would correspond to the cylinder 25, and the other end of the piston 73 would correspond to the cylinder 27. The specific construction and function of the servo-piston 73 forms no part of the present invention, but may be seen in greater detail in U.S. Pat. No. 4,117,768, incorporated herein by reference. Furthermore, within the scope of the present invention, the linkage member 61 could receive feedback movement directly from the swashplate 23 of the pump 11, rather than from the servo piston 73. All that is essential to the invention is that there be some form of feedback representative of movement or displacement of the swashplate. As is shown schematically in FIG. 1, the linkage member 61 serves a dual function, providing the input movement from the handle 47 to the valve spools 63 and 65, and then providing the follow-up movement thereto.

Figure 4:
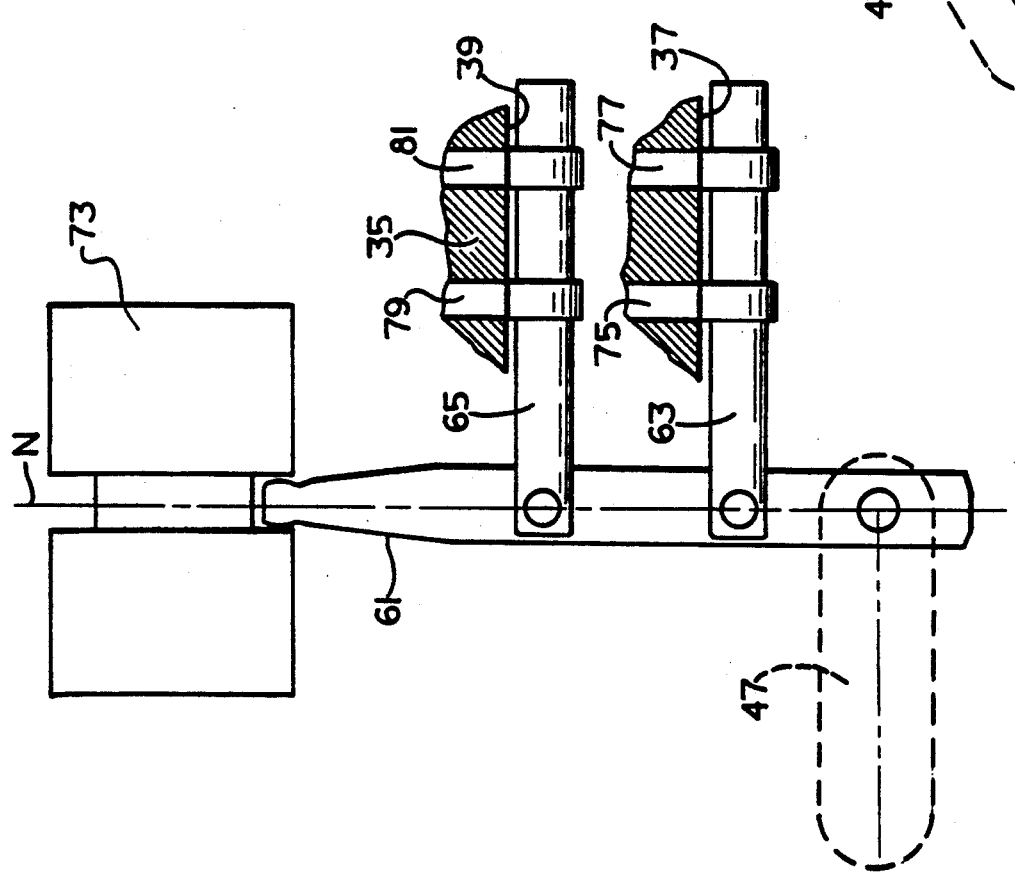

Referring now to FIG. 4, the valve housing 35 (shown only fragmentarily in FIG. 4) defines a pair of fluid passages 75 and 77. For clarity of illustration, the lands on the main and secondary valve spools 63 and 65 are shown as being "zero lap", i.e., each land is the same width as the adjacent fluid passage, and with the valve spools in the neutral position shown in FIG. 4, each side of each fluid passage is in line-to-line alignment with the respective spool lands. However, it should be understood that the zero lap relationship is being shown herein merely to simplify the illustration and explanation of the invention, and the invention is not limited to any particular lap relationship. Therefor, in the neutral position of FIG. 4, the fluid passages 75 and 77 are blocked from fluid communication with the fluid pressure in the conduit 43, and are also blocked from fluid communication with the system reservoir 41. Similarly, the valve housing 35 defines a pair of fluid passages 79 and 81 which, with the secondary valve spool 65 in the neutral position of FIG. 4, are blocked from fluid communication with both the fluid pressure in the conduit 43, and the system reservoir 41.

Referring again to FIG. 1, in conjunction with FIGS. 2 through 4, it may be seen that each of the main and secondary valve spools 63 and 65 comprises a fairly conventional three-position, four-way flow control valve. The various flow control passages (75 through 81), described in connection with FIG. 4, communicate between the valve spools 63 and 65 and a pair of solenoid valves 83 and 85. The solenoid valve 83 has an outlet conduit 87 connected to the fluid conduit 29, while the solenoid valve 85 has an outlet conduit 89, connected to the fluid conduit 31. It should be understood by those skilled in the art that the use of solenoid valves to control the flow of control pressure between the spools 63 and 65 and the stroking cylinders 25 and 27 is not an essential feature of the present invention. The solenoid valves could be replaced by any other type of control valve arrangement effective to perform the described function.

Operation-Normal Mode

Figure 5:
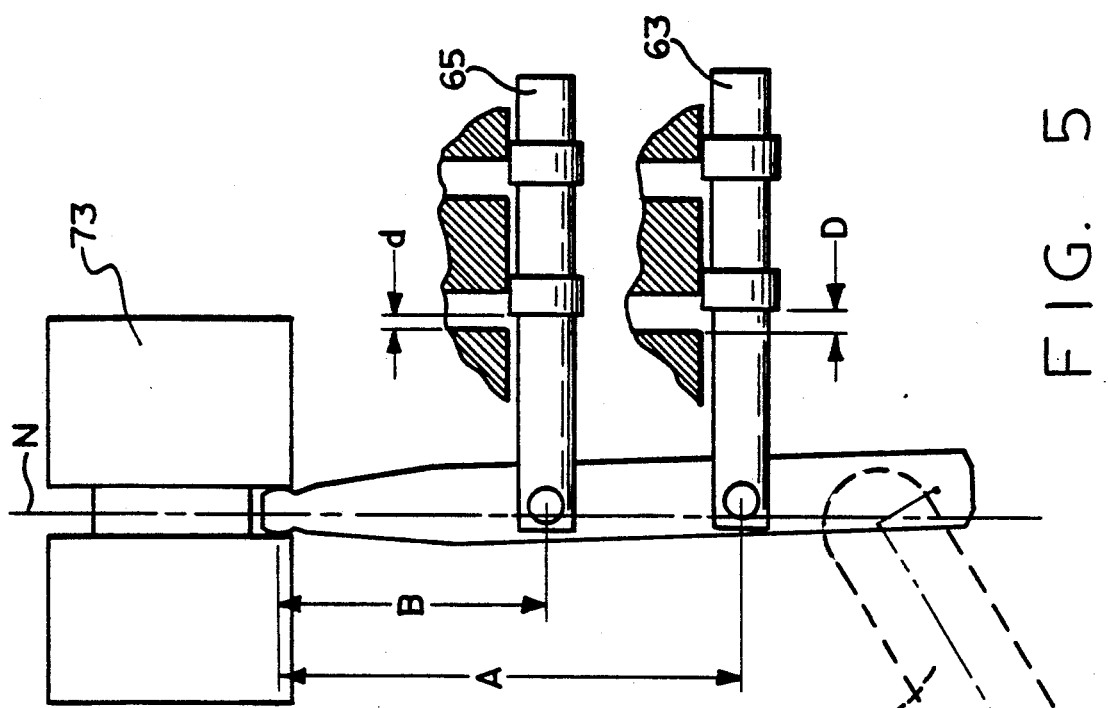
FIGS. 4 through 7 are somewhat schematic views, generally similar to FIG. 2, illustrating the control of the present invention in the neutral position, and in various operating positions, respectively.

Referring now primarily to FIG. 5, the operation of the control assembly 33 will be described. As was described previously, when the manual control handle 47 is rotated counter-clockwise, the linkage member 61 is also rotated counter-clockwise (about its servo-end 69). Referring again briefly to FIG. 4, it may be seen that when the control assembly 33 is in the neutral position, the servo-piston 73 is centered relative to a neutral reference line N, the axis of the linkage member 61 coincides with the neutral line N, the connections of the valve spools 63 and 65 to the linkage member 61 are located on the neutral line N, and the axes of the stud member 49 and pin member 59 are disposed on the neutral line N. When the manual handle 47 is rotated counter-clockwise, the servo-piston 73 is still (instantaneously, and for purposes of explanation) centered on the neutral line N, but the linkage member 61 is now angularly displaced (also counter-clockwise), as shown in FIG. 5. The main valve spool 63 is connected to the linkage member 61 at a location which is disposed a distance A from the servo-end 69, while the secondary valve spool 65 is connected to the linkage member 61 at a distance B from the servo-end 69. These distances A and B may also be referred to hereinafter as linkage lengths A and B, but it should be clearly understood that the lengths A and B are not limited, in the reference, to the distances to a servo-piston. For example, if the pump is of the type shown schematically in FIG. 1, having separate stroking cylinders 25 and 27, the linkage lengths could be measured merely to the end of the particular linkage member, or perhaps to a point of connection of the linkage member to the swashplate 23.

With the linkage member 61 angularly displaced as shown in FIG. 5, and the main and secondary valve spools 63 and 65 disposed at the differing linkage lengths A and B, respectively, the main valve spool 63 is displaced further (a distance "D") from its neutral position than is the secondary valve spool 65 (a distance "d"). The manner in which the control assembly 33 of the present invention makes use of this relationship will be explained in greater detail subsequently.

Referring again primarily to FIG. 1, it will be assumed for purposes of subsequent description that the position of the valve spools 63 and 65 in FIG. 5 corresponds to upward movement of the valve spools 63 and 65 in FIG. 1, to an operating position in which the fluid conduit 43 would be connected to the fluid passage 75 of the main valve spool 63, and to the fluid passage 79 of the secondary valve spool 65. Assuming further that the vehicle operator wishes to operate the hydrostatic transmission in its normal operating mode, the operator would select (as by means of a toggle switch or some other appropriate switch not shown herein) the normal operating mode, which would result in deactivation of the coils of both of the solenoid valves 83 and 85, and therefore, operation of both of those valves in the positions shown in FIG. 1.

With the solenoid valves both deactivated, movement of the main and secondary valve spools 63 and 65 upward in FIG. 1 results in communication of control pressure from the fluid conduit 43 to the fluid passage 75, and from there through the solenoid valve 83 to the outlet conduit 87, and then to the stroking cylinder 25. At the same time, fluid is permitted to return from the stroking cylinder 27 through the outlet conduit 89, through the solenoid valve 85 to the fluid passage 77, then through the main valve spool 63 to the system reservoir 41. The fluid passage 79 (which is also in communication with charge pressure in the fluid conduit 43), is blocked by the solenoid valve 83, while the fluid passage 81 (which is also in communication with the system reservoir 41) is blocked by the solenoid valve 85. Therefore, with the solenoid valves 83 and 85 deactivated, only the main valve spool 63 is operable. The secondary valve spool 65 is inoperable.

Figure 6:
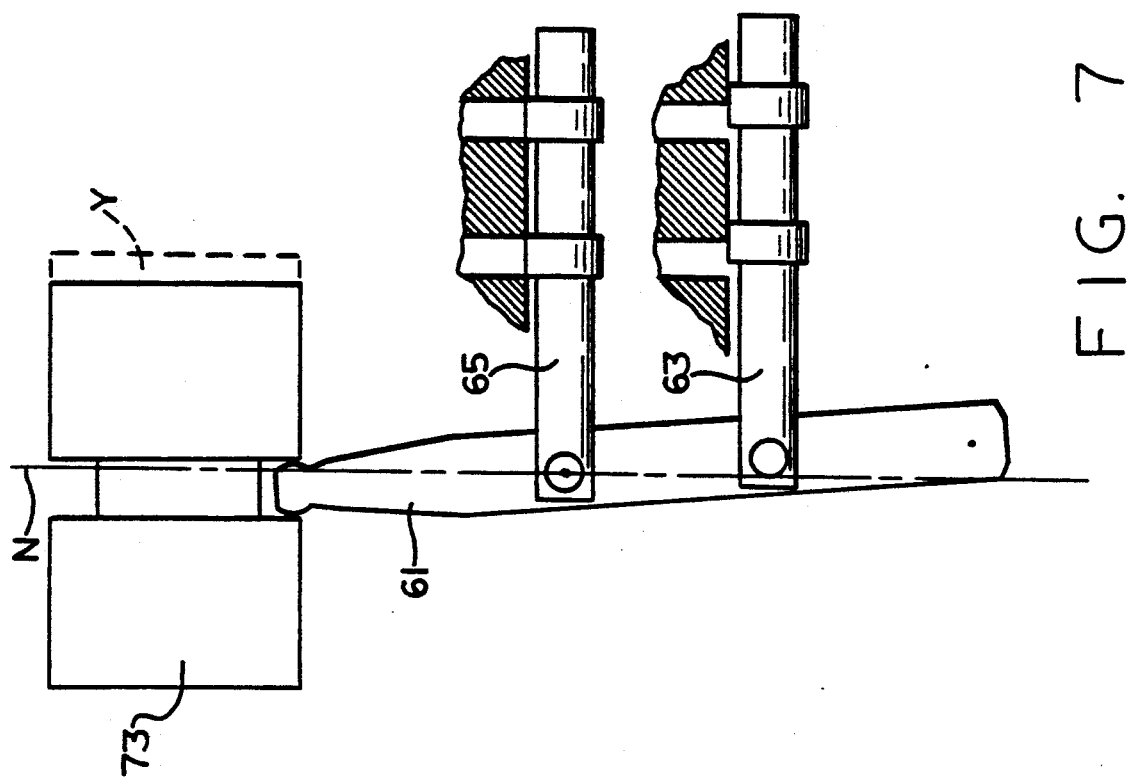

Referring now to FIG. 6, the result of the above-described control operation is that a predetermined volume X of control fluid is communicated to the chamber at the right end of the servo-piston 73, thus displacing the servo-piston 73 to the position shown in FIG. 6. Such movement of the servo-piston 73 results in follow-up movement of linkage member 61, in a manner which is generally well known in the art, in which the linkage member 61 pivots about the axis of the stud member 49. The follow-up movement is effective to return the main valve spool 63 to its neutral position. Note that the connection point between the main spool 63 and the linkage member 61 is again located on the neutral line N. With the main valve spool 63 again in its neutral position, there is no additional flow of control pressure to the servo-piston 73, and it remains in the position shown in FIG. 6. As a result, the swashplate 23 of the variable pump 11 remains in the position corresponding to this position of the servo-piston 73. It should also be noted in FIG. 6 that the secondary valve spool 65 has now moved from its actuated position shown in FIG. 5 past its centered position (as shown in FIG. 4) to a position which would correspond to actuation of the swashplate 23 in the opposite direction. However, as described in connection with FIG. 1, communication to and from the secondary valve spool 65 is blocked by the solenoid valves 83 and 85, such that the position of the secondary spool 65 in FIG. 6 does not effect the displacement of the pump 11.

Merely by way of example, and to assist in understanding the operation and application of the present invention, it will be assumed that in FIG. 5 the manual control handle 47 was rotated 32 degrees in a counterclockwise direction. With the solenoid valves 83 and 85 deactivated, and the control assembly 33 operating in its normal mode, the result is displacement of the swashplate 23 from 0 degrees (neutral) to a swash angle of 17 degrees. In a typical, commercial axial piston pump, both the control handle displacement and the swashplate displacement described above would correspond to maximum output of the pump 11.

Operation-Inching Mode

Figure 7:
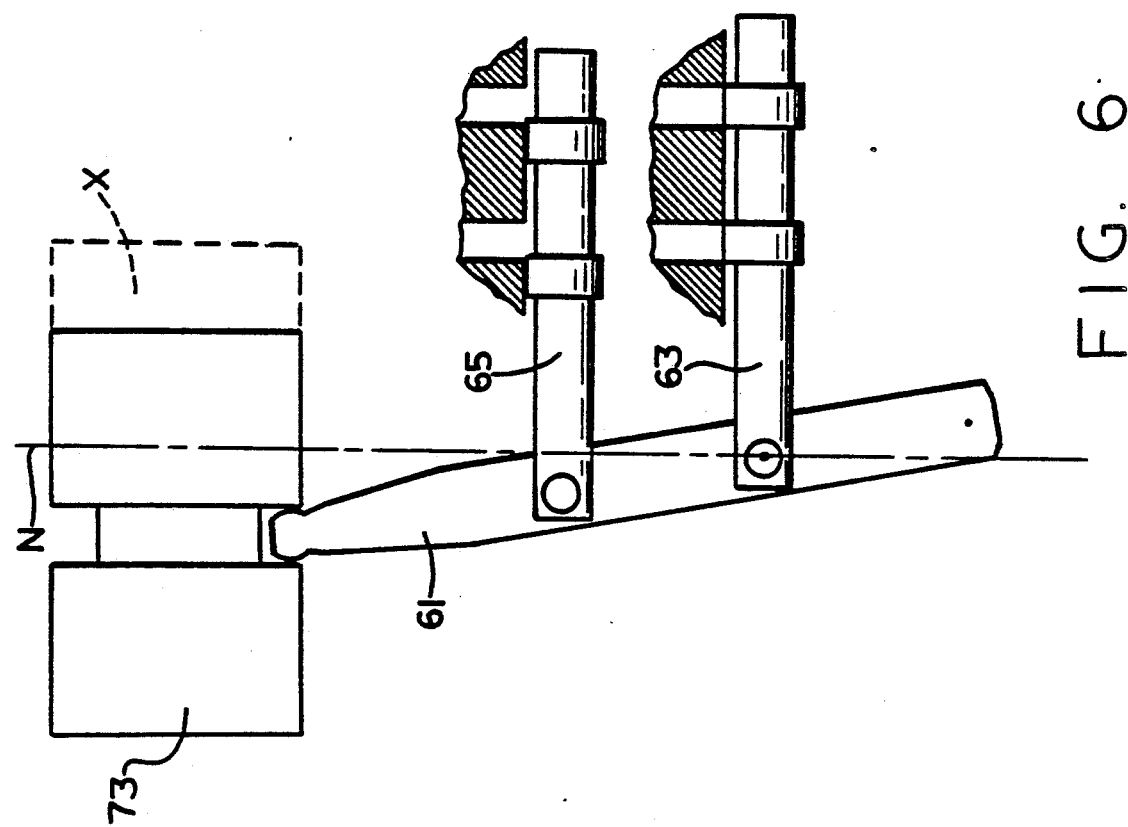

Referring now primarily to FIG. 7, in conjunction with FIG. 1, it will be assumed that the vehicle operator wishes to operate the hydrostatic transmission in a secondary mode, one example of which would be operation of the vehicle in an inching mode. When the vehicle operator selects the inching mode, both of the solenoid valves 83 and 85 are activated, thus moving downward in FIG. 1 in opposition to the force of their respective biasing springs. In the activated position of the solenoid valves 83 and 85, the fluid passages 75 and 77 from the main valve spool 63 are blocked by the solenoid valves 83 and 85, respectively. At the same time, and still assuming upward movement of the valve spools 63 and 65, the fluid passage 79 is now in communication with the outlet conduit 87 through the solenoid valve 83, thus communicating charge pressure from the fluid conduit 43 to the stroking cylinder 25. At the same time, return fluid from the stroking cylinder 27 is communicated to the outlet conduit 89, and then through the solenoid valve 85 to the fluid passage 81, then through the secondary valve spool 65 to the system reservoir 41. Thus, when operating in the inching mode, fluid is still communicated in generally the same way. However, as was noted in FIG. 5, the secondary valve spool 65 was not displaced from its neutral position as much as was the main valve spool 63 (the relative displacements being a function of the linkage lengths A and B), and therefor, a smaller volume Y of fluid is communicated to the right end of the servo-piston 73, and displaces the piston 73 a smaller distance in FIG. 7 than it was displaced in FIG. 6. The volume Y of charge fluid moves the servo-piston to a position such that the linkage member 61 returns the secondary valve spool 65 to its neutral position. Note that the point of connection between the secondary spool 65 and the linkage member 61 is again on the neutral line N in FIG. 7. With the secondary spool 65 again in its neutral position, there is no further fluid communicated to the piston 73, and it remains in the position shown in FIG. 7, and the swashplate 23 of the pump 11 remains in a corresponding position.

By way of example only, when the control assembly 33 is in the inching mode, displacement of the manual handle 47 over its full 32 degree displacement as shown in FIG. 5 results in displacement of the swashplate 23 from its 0 degree (neutral) position to a swash angle of only 5 degrees. As a result of the present invention, but by way of example only, when the vehicle operator wishes to operate in an inching mode, the operator can move the manual control handle anywhere throughout its entire range of displacements, but the result is a "gain" of swashplate movement versus handle movement which is substantially less than in the normal operating mode. Such a control gives the operator a much "finer" control of vehicle speed when, for example, the vehicle is operating at a work site, and the relatively higher transport speed is not required.

Referring again to FIG. 6, it was mentioned in connection with the description thereof that, after the main valve spool 63 is returned to neutral, the secondary valve spool 65 has actually moved "over-center". The swashplate 23 is currently at a displacement of 17 degrees, but if the vehicle operator encounters a situation which requires operation in the inching mode, the operator may switch from the normal mode to the inching mode. Suddenly, the communication of control fluid to the servo-piston 73 is controlled by the secondary valve spool 65, which, because of its position in FIG. 6, will communicate some fluid to the left end of the servo-piston 73 (corresponding to communicating fluid to the stroking cylinder 27). The result is to decrease the displacement of the swashplate from 17 degrees to 5 degrees, but with the pump still operating in the same direction.

Therefor, the present invention provides an improved multiple-mode control which utilizes full control pressure from the charge pump 21 in both (all) modes of operation, such that the relationship between position of the swashplate 23 and the position of the control handle 47 is predictable, generally proportional, and independent of system pressure (i.e., pressure in the fluid conduits 15 and 17).

Although the present invention has been illustrated and described in connection with an embodiment in which both the main and secondary valve spools (63,65) are connected to a common linkage member (61), the invention is not so limited. In certain applications, it may be desirable (or necessary for packaging reasons) to connect the main and secondary valve spools to different linkage members, and such an arrangement is within the scope of the invention, as long as the linkage arrangement provides a relatively greater follow-up movement (distance D in FIG. 5) to the main valve spool than the follow-up movement (distance d, FIG. 5) which it provides to the secondary valve spool 65.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A variable displacement hydrostatic unit including fluid pressure responsive means for varying the displacement of the unit; charge pump means comprising the source of fluid for said displacement varying means; main control means including a main valve member movable between a neutral position (FIG. 4), blocking fluid communication from said charge pump means to said displacement varying means, and a first control position (FIG. 5), permitting fluid communication from said charge pump means to said displacement varying means; and feedback linkage means operably associated with said main valve member, to move said main valve member from said first control position to said neutral position, in response to the flow of a predetermined volume X of fluid from said charge pump means to said displacement varying means, said main valve member and said feedback linkage means defining a main linkage length A, characterized by:
  (a) said main control means further including a secondary valve member movable between a neutral position (FIG. 4), blocking fluid communication from said charge pump means to said displacement varying means, and a first control position (FIG. 5) permitting fluid communication from said charge pump means to said displacement varying means;
  (b) feedback linkage means operably associated with said secondary valve member, to move said secondary valve member from said first control position to said neutral position, in response to the flow of a predetermined volume Y of fluid from said charge pump means to said displacement varying means, said volume X being substantially greater than said volume Y; and
  (c) said secondary valve member and said feedback linkage means defining a secondary linkage length B, said length A being substantially greater than said length B; and
  (d) control means operable between a main control condition (FIG. 1) blocking fluid communication through said secondary valve member to said displacement varying means, and a secondary control position blocking fluid communication through said main valve member to said displacement varying means.

2. A hydrostatic unit as claimed in claim 1, characterized by said feedback linkage means further including a manual input member movable from a neutral position (FIG. 4) in which said main and secondary valve members are in said neutral position, to a fully actuated position (FIG. 5) in which said main and secondary valve members are both in their first control positions.

3. A hydrostatic unit as claimed in claim 2, characterized by said feedback linkage means being configured, such that movement of said manual input member to said fully actuated position (FIG. 5) results in movement of said main valve member a distance D to its first control position, and results in movement of said secondary valve member a distance d to its first control position, the distance D being substantially greater than the distance d.

4. A hydrostatic unit as claimed in claim 1, characterized by said main control means comprises a valve housing defining main and secondary valve bores, said main valve member comprising a main valve spool disposed in said main valve bore, and said secondary valve member comprising a secondary valve spool disposed in said secondary valve bore.

5. A hydrostatic unit as claimed in claim 1, characterized by said main and secondary valve bores being substantially parallel to each other, and said main and secondary valve bores and valve spools being substantially identical in size and overall configuration.

6. A hydrostatic unit as claimed in claim 1, characterized by said feedback linkage means comprising a linkage member having one end operably associated with said displacement varying means and another end operably associated with a manual input member, said main valve member being operably connected to said linkage member at said linkage length A from said displacement varying means, and said secondary valve member being operably connected to said linkage member at said linkage length B from said displacement varying means.

7. A hydrostatic unit as claimed in claim 1 characterized by said control means comprising separate solenoid valve members disposed downstream, in series flow relationship, between said main and secondary valve members and said displacement varying means.

8. A variable displacement hydrostatic unit including fluid pressure responsive means for varying the displacement of the unit; charge pump means comprising the source of fluid for said displacement varying means; main control means including a main valve member movable between a neutral position (FIG. 4), blocking fluid communication from said charge pump means to said displacement varying means, and a first control position (FIG. 5), permitting fluid communication from said charge pump means to said displacement varying means; and feedback linkage means operably associated with said main valve member, to move said main valve member from said first control position to said neutral position, in response to the flow of a predetermined volume X of fluid from said charge pump means to said displacement varying means, said main valve member receiving a follow-up movement (D) from said feedback linkage means, in response to the flow of said predetermined volume X of fluid; characterized by:
  (a) said main control means further including a secondary valve member movable between a neutral position (FIG. 4), blocking fluid communication from said charge pump means to said displacement varying means, and a first control position (FIG. 5) permitting fluid communication from said charge pump means to said displacement varying means;
  (b) feedback linkage means operably associated with said secondary valve member, to move said secondary valve member from said first control position to said neutral position, in response to the flow of a predetermined volume Y of fluid from said charge pump means to said displacement varying means, said volume X being substantially greater than said volume Y, said secondary valve member receiving a follow-up movement (d) from said feedback linkage means, in response to the flow of said predetermined volume Y of fluid, said follow-up movement (D) of said main valve member being substantially greater than said follow-up movement of said secondary member; and
  (c) control means operable between a main control condition (FIG. 1) blocking fluid communication through said secondary valve member to said displacement varying means, and a secondary control position blocking fluid communication through said main valve member to said displacement varying means.

* * * * *